May 20, 1969 D. C. UIMARI ET AL 3,445,684
HIGH SPEED TRAILING EDGE BISTABLE MULTIVIBRATOR
Filed Dec. 15, 1965
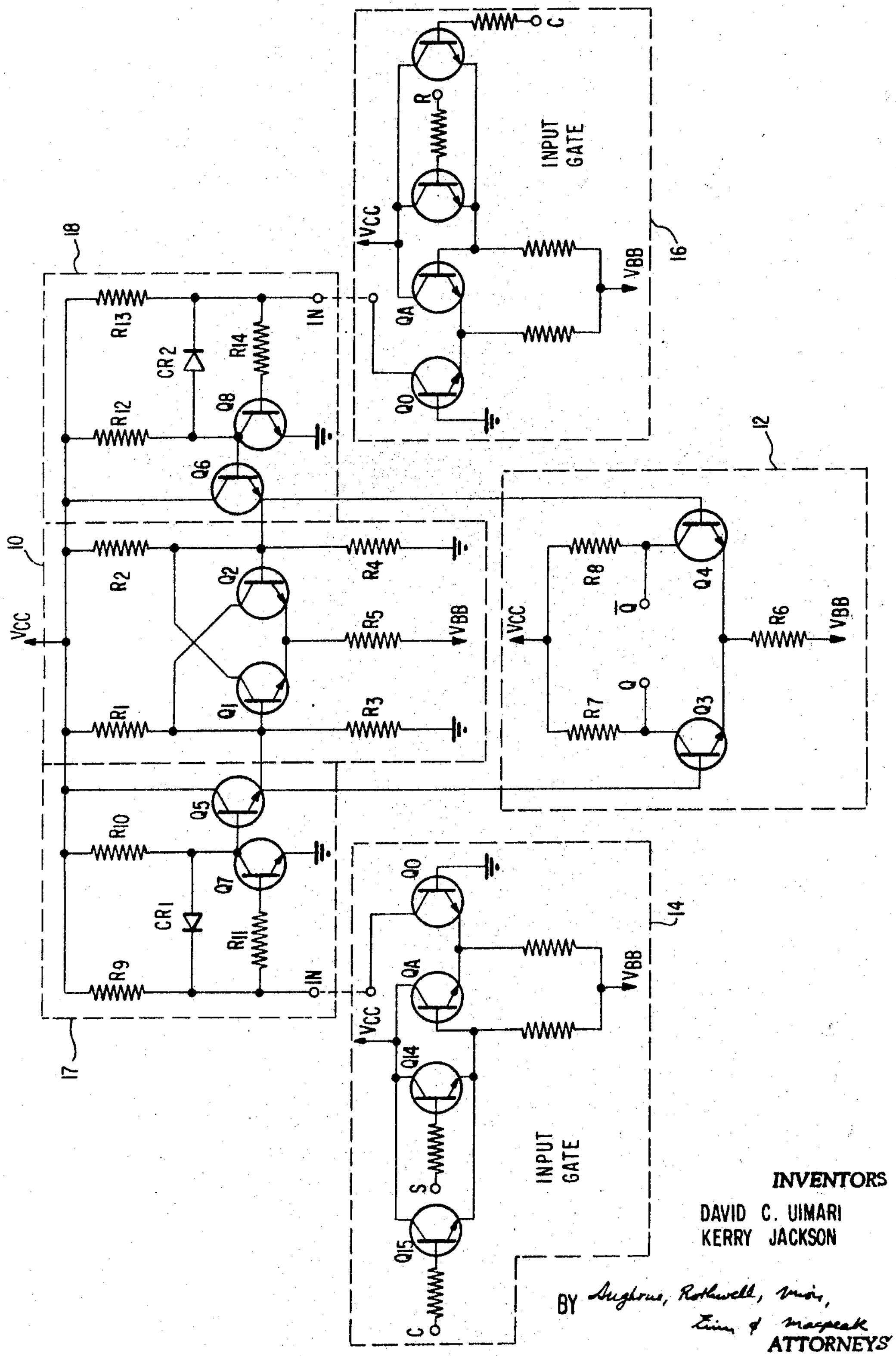
INVENTORS
DAVID C. UIMARI
KERRY JACKSON
BY Sughrue, Rothwell, Mion, Zinn & Macpeak
ATTORNEYS United States Patent Office 3,445,684

Patented May 20, 1969

3,445,684

HIGH SPEED TRAILING EDGE BISTABLE MULTIVIBRATOR

David C. Uimari and Kerry A. Jackson, Raleigh, N.C., assignors to Corning Glass Works, Corning, N.Y., a corporation of New York Filed Dec. 15, 1965, Ser. No. 513,984
Int. Cl. H03k 17/26, 17/28
U.S. Cl. 307—269 11 Claims The invention relates to bistable multivibrators, and more particularly, to transistorized bistable multivibrators of a type which respond to the lagging edge of an input pulse thereby preventing race conditions.

Various bistable multivibrator circuits and their uses are well known in the art. Typically, a bistable multivibrator is an electrical circuit which has two stable states. When undisturbed by a triggering pulse, the circuit remains in one of the two stable states. When the input pulse is applied to a proper input of the circuit, it switches to the second stable state and remains there until a further input pulse is applied. The state of such a bistable circuit may be detected, or further used to control other circuits, by connecting an output lead to a selected point in the circuit. In one of the stable states, the output lead will be at a relatively high voltage whereas in the opposite state of the circuit the output lead will be at a relatively low voltage. Often, two output leads are used, the second being connected to a selected point in the circuit such that when the first output lead is at a relatively high voltage the second output lead is at a relatively low voltage and when the bistable circuit switches its state, the reverse is true.

The alternate or two stable state logic of such a circuit is referred to in the art by different names, such as "ON" and "OFF," "SET" and "RESET", "1" and "0." The selection of terminology used in discussing bistable circuits is a matter of choice and is usually dictated by the overall system of which the bistable circuit form a small part. In the present application, the invention will be described in conjunction with a negative logic bistable circuit. That is, a relatively high voltage state is referred to as "0" and a relatively low voltage state is referred to as "1." It should be noted that the choice is arbitrary and not intended to limit the invention in any manner.

Bistable circuits are commonly used as building blocks in computer logic technology. One of the most common uses is in pulse counters. For example, the simplest pulse counter would be count-of-2 counter and could comprise only a single bistable circuit. Such a circuit is said to count from 0 to 1, due to its two stable states. Somewhat more sophisticated counters comprise $n$ bistable multivibrators which are inter-connected so as to have the capability of representing $2^n$ binary numbers.

When the counter is in a particular state, the next input pulse, often called a clock pulse, is applied to trigger certain of the bistable circuits to particular states. The particular inputs to the individual bistable circuits are often gated by so-called SET and RESET input signals. These SET or RESET input signals may be and often are applied from the outputs of other bistable circuits in the total counter and gate the clock pulses to the proper inputs of the bistable circuit in accordance with a predetermined logic pattern. For example, assume the $n$th bistable circuit in a counter chain is in the "0" state and can be changed to the "1" state by the application of a clock pulse to its SET input. Further, assume that a "1" (a relatively low voltage signal in negative logic) is present at the SET 12D terminal of the input gate for the $n$th bistable circuit. The latter "1" may be the first output from the $n-1$ bistable circuit. When a "1" arrives at the clock input, it is gated to the set input by the 1 appearing at the SET terminal and applied to the SET input of the basic bistable circuitry. The basic bistable circuitry then switches from the "0" to the "1" state causing its output or outputs to reverse.

Since the clock pulse is often applied to the input gating circuits for all of the bistable circuits forming the counter, a result termed "race" may occur due to the switching of the bistable circuits. For example, referring to the above described condition where the SET input to the input gate of the $n$th bistable circuit was supplied from the first output of the $n-1$ bistable circuit assume that the clock pulse is also applied to the input gates of the $n-1$ bistable circuit. In this condition, the clock pulse will be passed as previously explained to the SET input of the $n$th basic bistable thereby switching it to an opposite state. However, at the same time the clock pulse may be causing the $n-1$ bistable circuit to change states thereby removing the "1" from the SET terminal of the input gate and placing a "1" on the RESET terminal of the input gate to the $n$th bistable circuit. If the latter condition occurs before the termination of the clock pulse, the $n$th bistable circuit will switch back to the "0" or "RESET" state. This so-called race situation disrupts the entire pattern of counting since all of the bistable elements are usually inter-connected in the manner described.

Circuits have been designed to prevent the race situation by causing the basic bistable circuit to respond to the lagging edge of the clock pulses. However, most circuits of this nature known in the art are either highly complex (using essentially two separate flip-flops connected by some type of inhibit gating) or rely on capacitors to AC connect the clock pulse to the circuit. In the present invention, the circuit which provides lagging edge triggering of the basic bistable does not require two separate flip-flops connected by some type of inhibit gating nor does it require capacitors to AC to connect the clock pulse to the circuit. The present invention is a simple circuit which causes the basic bistable to be triggered by the lagging edge of the clock pulse and also provides rapid switching as soon as the lagging edge appears.

It is therefore an object of the present invention to provide a new and improved bistable multivibrator circuit responsive to the lagging edge of an input pulse.

It is a further object of the present invention to provide a new and improved circuit for preventing race conditions in a bistable circuit.

The foregoing and other objects, features and advantages of the invention will be apparent from the following more particular description of preferred embodiments of the invention, as illustrated in the accompanying drawing.

The only drawing is a schematic diagram of a preferred embodiment of the invention in combination with a basic bistable connection and a transistorized pair of input gates.

The high speed trailing edge bistable multivibrator shown in the drawing comprises a basic bistable connection shown in the dotted block 10, an output amplifier indicated by the dotted block 12, two input gates 14 and 16 and two storage gates 17 and 18. The basic bistable circuit 10 and amplifier 12 are illustrated in detail only for the purpose of better understanding the present invention. However, it should be understood that other conventional basic bistable connections may be used in conjunction with the present invention and the particular circuit shown is not intended to be in any way limiting. (Switching speeds, however, are influenced by the type of circuit used; the one shown being the fastest available.)

Basic bistable 10 operates in a known manner which is explained briefly herein. Transistors Q1 and Q2 have their emitters connected together and through resistance R5 to a negative power supply and have their collectors connected to the respective bases of their opposite number. The base-collector connection insures that when one transistor is conducting, the other is turned off. If Q1 is conducting, its collector is low, thereby maintaining the base of Q2 at a low voltage. The low voltage in the base of Q2 cuts off that transistor thereby maintaining the collector of Q2 at a relatively high voltage. The high voltage on the collector of Q2 is applied to the base of Q1 thereby maintaining that transistor in a conducting state. For the purposes of explanation ,the state just described is considered to be the "1" or SET state. The state may be changed by either drawing current out of the base of Q1 or supplying current into the base of Q2. The particular circuit shown in the drawing operates by supplying current to the bases of either Q1 or Q2.

If current is supplied to the base of Q2, the voltage at that point begins rising until it is equal to the voltage at the base of Q1. Any additional rise in the Q2 base voltage causes switching to take place. Q2 begins conducting thereby lowering its collector voltage and in turn lowering the base voltage of Q1. As the base voltage of Q1 falls, Q1 begins conducting less current thereby causing its collector voltage to be raised which in turn raises the voltage on the base of Q2. The action is cumulative causing Q1 to completely cut off and Q2 to be conducting. The latter stable state is referred to as the RESET or "0" state. The output voltages on the collectors Q1 and Q2 are amplified by transistors Q3 and Q4 of output amplifier 12. When the basic bistable is in the SET state, the Q output is low (1) and the $\overline{Q}$ output is high (0).

Input gates 14 and 16 are negative logic AND gates. Since both input gates are identical, only one will be explained. Gate 14 comprises input transistors Q15 and Q14 which are controlled by the clock and SET inputs at C and S respectively. As long as either the C or the S inputs has a binary "0" (high voltage) applied thereto, the base of $Q_A$ is high causing $Q_A$ to be conducting and $Q_0$ to be turned off. If a binary "1" is present at the S input, the input gate is in the ready condition and turns on $Q_0$ when a high to low clock pulse is received. When $Q_0$ turns on, the voltage at IN is lowered.

The lagging edge triggering circuit or storage gate 17 is connected between the output of input gate 14 and the SET input terminal (Q1 base) of the basic bistable 10; storage gate 18 is connected between input gate 16 and the RESET input (Q2 base) of the basic bistable 10. Since circuits 17 and 18 are identical only circuit 17 will be described. The lagging edge triggering circuit 17 comprises a transistor Q5 having its collector connected to the positive supply $V_{CC}$ and its emitter connected to the base of Q1. When transistor Q5 is turned off it has no effect on the basic bistable, but when it is turned on, it supplies current to the base of Q1 causing basic bistable 10 to switch states if it was previously in the RESET state. The conduction of transistor Q5 is controlled initially by transistor Q7 whose collector is connected to the base of Q5 and whose emitter is grounded. The collector of Q7 is also connected to the positive power supply $V_{CC}$ through resistance R10. The base of Q7 is connected to the input terminal IN through a resistance $R_{11}$, and the collector of Q7 is also connected to the input terminal IN through a diode CR1. The input terminal is additionally connected to the power supply $V_{CC}$ through resistance R9.

The operation of the circuit will now be explained. Assume that the basic bistable 10 is in the RESET state, that is, Q2 is conducting and Q1 is turned off, and also assume that a binary 1 is present at the S input to input gate 14. Prior to the arrival of a clock pulse at the C terminal, $Q_0$ is non-conducting and storage gate 17 is in a condition which may be described as its quiescent condition. Current flows from the positive power supply $V_{CC}$ through resistors R9 and R11 into the base of Q7, turning Q7 on. The values of R9, R11, and R10 are selected such that transistor Q7 saturates. The voltage at the base of Q5 is therefore the saturation voltage of Q7 which is less than the threshold voltage required to turn on Q5. Therefore, as long as Q7 is turned on and saturated, Q5 will remain turned off. When the leading edge of the clock pulse, which is a falling voltage, appears at input C, transistor $Q_0$ begins to conduct. As collector current starts to flow through $Q_0$, the voltage at IN begins to fall. When it reaches the minimum base voltage of Q7, Q7 begins to turn off. At the same time, however, the voltage at the base of Q5 cannot rise above the IN voltage plus the drop across diode CR1. If the rise time of $Q_0$ collector current is fast enough and the storage time of Q7 long enough, by the time Q7 starts to turn off all of the Q7 collector current has been diverted through diode CR1. This keeps the base voltage of Q5 from changing, and therefore Q5 remains turned off even though Q7 is no longer saturated.

As stated above, Q5 will remain off during the leading edge of the clock pulse provided the rise time of $Q_0$ collector current is fast enough. Since the rise time of $Q_0$ depends partly on the fall time of the clock pulse voltage, a maximum all time for the clock should be specified. Using a silicon diode for CR1, the maximum allowable clock pulse fall time has been found experimentally to be approximately 200 nanoseconds For high speed systems where clock pulse widths are on the order of 100 to 500 nanoseconds, this fall time requirement should be adequate. For slower systems, diode CR1 can be a germanium diode where, experimentally, fall times up to 2 microseconds have not caused triggering on the leading edge. Also, a capacitor placed across diode CR1 will increase the minimum fall time.

Once the collector current of $Q_0$ reaches its maximum value, the IN voltage has fallen to its minimum value. The magnitude of R9 and R10 are chosen so that the minimum input voltage plus the diode drop is not enough to turn Q5 on. In other words, Q5 remains off during the fall time of the clock pulse and all the while the clock pulse remains low. This means that the basic bistable 10 cannot change states during this time. At the end of the clock pulse time, the lagging edge appears at terminal C as a rising voltage. As the clock pulse begins to rise toward the maximum value, $Q_0$ starts to turn off and the input voltage at IN starts to rise. The voltage at the base of Q7 will also start to rise, but at a slower rate than the voltage at IN since there is capacitance associated with the base. The rate at which the base voltages of Q5 and Q7 rise is a function of the rate at which the inherent base capacitors can be charged and this in turn is a function of the resistances through which the charge must flow to reach the respective bases. If the resistance in the base circuit of Q5 (CR1) is much smaller than the resistance in the base of Q7 (R11) the base voltage of Q5 will increase faster than the base voltage of Q7. Since CR1 is a forward biased diode, its resistance (even in the reverse direction) is very small.

As the base voltage of Q5 increases, it reaches a point where the base-emitter junction of Q5 becomes forward biased and Q5 turns on. Current is then passed through Q5 to the base of Q1 and the voltage at the Q1 base starts to rise. When enough charge has been supplied, the voltage at the base of Q1 becomes equal to the voltage at the base of Q2. Any additional charge from Q5 will start the switching action of basic bistable 10. The rising collector current in Q1 lowers the voltage at the base of Q2 which begins turning Q2 off. A decrease in the collector current of Q2 allows the base voltage of Q1 to increase still more, further turning on Q1 and turning off Q2. In other words, once Q1 starts to turn on, switching proceeds self-sustained in the basic bistable circuit without any further assistance from Q5.

While the latter condition is taking place, the base voltage of Q7 has been increasing from the value it had at the end of the clock pulse to some new value. If the new value is less than the threshold value for Q7, then Q7 will remain off during the time required for the basic bistable to change states. That is of course a necessary condition since any Q7 collector current will lower the base voltage of Q5 tending to turn Q5 off. If Q7 turns on prior to the point where the basic bistable becomes self-sustaining, the circuit will not operate. It is necessary therefore that the base voltage of Q7 does not reach the threshold level until switching starts in the basic bistable. The time required for the base voltage to reach the threshold level is determined by the rise time of the input voltage (clock pulse) and the initial value of the base voltage. It is of course also dependent upon the magnitudes of the various capacitances and resistances in the circuit. These, however, have been fixed by either the transistor itself—in the case of capacity—and by other circuit requirements in the case of resistance. As far as the rise time is concerned, it can be seen that the circuit compensates somewhat for the different possible values of rise time. In other words, if the rise time is fast, the base voltage of Q7 rises quickly, but so does the base voltage of Q5 and hence the switching speed of the basic bistable circuit is fast. If the rise time is slow, the base voltage of Q5 increases slowly, but so does the base voltage of Q7. Moreover, since R10 is much smaller than R11, it can be shown that the base voltage at Q5 will always increase faster than the base voltage at Q7.

As an additional feature, a trigger or JK flip-flop can be realized from the circuit shown in the drawing by adding a third transistor in parallel with the two input transistors of the input gates 14 and 16 and by connecting the input terminals thereto to the Q and $\overline{Q}$ ouputs. Under these conditions, as long as the R and S terminals are low (or disconnected) the circuit changes state at each clock pulse. Also, by controlling R and S, a RST flip-flop can be realized for the same connections. Under these conditions, the circuit will SET or RESET during the clock pulse depending upon whether S or R is low. If S and R are both low, the circuit will change states during the clock pulse.

Although from the description of the invention given above, it will be apparent to those skilled in the art that various different values of resistances, diodes, transistors, pulse widths, rise times, and fall times may be selected to form an operating circuit in accordance with the teachings herein, a list of the parameter values for a typical operating circuit are given below:

$V_{CC}=+1.8\pm3\%$ volts
$V_{BB}=-3.0\pm3\%$ volts
R1,2=359±3% ohms
R3,4=40.8±3% ohms
R5=218±3% ohms
R6=98.5±3% ohms
R7,8=100±3% ohms
R9,13=687±5% ohms
R10, 12=91.5±5% ohms
R11,14=723±5% ohms
Transistors—2N2369

In summary, a simple circuit easily adapted for microcircuitry has been described which is responsive to the trailing edge of a clock pulse input for triggering a basic bistable circuit. While the invention has been particularly shown and described with reference to preferred embodiments thereof, it will be understood by those skilled in the art that various changes in form and details may be made therein without departing from the spirit and scope of the invention.

What is claimed is:

1. A lagging edge pulse-triggered bistable multivibrator comprising a basic bistable circuit having first and second stable states, first and second inputs and being of the type which is responsive to a switching signal at said first input for switching the basic bistable to the first state and responsive to a switching signal at said second input for switching the basic bistable to the second state, a first electronic switching means having a control electrode and two conducting electrodes, said conducting electrodes being connected respectively between a charge supplying means and said first input, a second electronic switching means having a control electrode and two conducting electrodes for maintaining said first electronic switching means in a non-conducting state when conducting, said second switching means being normally conducting in the absence of a trigger pulse, means responsive to the leading edge of a trigger pulse for turning off said second electronic switching means and maintaining the control electrode of said first electronic switching means below the turn-on threshold level, and means responsive to the lagging edge of the trigger pulse for turning on the first switching means for a period sufficient to pass a switching signal to said first input.

2. The bistable multivibrator as claimed in claim 1 further comprising a third electronic switching means having a control electrode and two conducting electrodes, said conducting electrodes being connected respectively between a charge supplying means and said second input, a fourth electronic switching means having a control electrode and two conducting electrodes for maintaining said first electronic switching means in a non-conducting state when said fourth electronic switching means is conducting, said fourth electronic switching means being normally conducting in the absence of a trigger pulse, means responsive to the leading edge of a trigger pulse for turning off said fourth electronic switching means and maintaining the control electrode of said third electronic switching means below the turn-on threshold level, and means responsive to the lagging edge of the trigger pulse for turning on the third electronic switching means for a period sufficient to pass a switching signal to said second input.

3. A lagging edge triggered transistorized flip-flop of the type comprising a basic bistable circuit having first and second switching inputs, the improvement comprising a first transistor having an emitter connected to said first switching input and a collector adapted to be connected to a power supply, first impedance means having first and second terminals, the first terminal being connected to the base of said first transistor and the second terminal being adapted to be connected to said power supply, a second transistor having base, emitter and collector electrodes, said collector electrode being connected to the base of said first transistor, and the emitter being connected to an electrical reference terminal, a second impedance comprising first and second resistors connected together at a common terminal, said second impedance having first and second terminals, the first terminal being connected to the base of said second transistor and the second terminal being adapted to be connected to said power supply, first asymmetrical conducting means connected between said common terminal and the base of said first transistor, and means connected to said common terminal, responsive to a trigger pulse applied thereto for drawing current out of said common terminal, the latter means appearing as an open circuit in the absence of a trigger pulse.

4. The flip-flop as claimed in claim 3 wherein said first and second transistors are NPN type transistors.

5. The flip-flop as claimed in claim 4 wherein said first impedance is much less than said second impedance.

6. The flip-flop as claimed in claim 5 wherein said asymmetrical conducting means is a silicon diode having its anode connected to the base of said first transistor and its cathode connected to said common terminal.

7. The flip-flop as claimed in claim 5 wherein said asymmetrical conducting means is a germanium diode having its anode connected to the base of said first transistor and its cathode connected to said common terminal.

8. The flip-flop as claimed in claim 3, the improvement further comprising a third transistor having an emitter connected to said second switching input and a collector adapted to be connected to said power supply, third impedance means having first and second terminals, the first terminal being connected to the base of said third transistor and the second terminal being adapted to be connected to said power supply, a fourth transistor having base, emitter and collector electrodes, said collector electrode being connected to the base of said third transistor, and the emitter being connected to an electrical reference terminal, a fourth impedance comprising second and third resistors connected together at a second common terminal, said fourth impedance having first and second terminals, the first terminal being connected to the base of said fourth transistor and the second terminal being adapted to be connected to said power supply, second asymmetrical conducting means connected between said second common terminal and the base of said third transistor, and means connected to said second common terminal, responsive to a trigger pulse applied thereto for drawing current out of said second common terminal, the latter means appearing as an open circuit in the absence of a trigger pulse.

9. The flip-flop as claimed in claim 8 wherein said first, second, third and fourth transistors are NPN type transistors, said first and third impedances are respectively much less than said second and fourth impedances and said asymmetrical conducting means are silicon diodes.

10. The flip-flop as claimed in claim 8 wherein said first, second, third and fourth transistors are NPN type transistors, said first and third impedances are respectively much less than said second and fourth impedances and said asymmetrical conducting means are germanium diodes.

11. A lagging edge clock pulse triggered flip-flop of the type comprising a basic bistable circuit having first and second input terminals for receiving switching signals, the improvement comprising a positive power supply, a first NPN transistor having base emitter and collector electrodes, the emitter being connected to the first input terminal and the collector being connected to the positive power supply, a first resistor connected between the base of said first transistor and said positive power supply, a second NPN transistor having base, emitter and collector electrodes, the collector electrode being connected to the base of said first transistor and the emitter being connected to the reference potential, second and third resistors connected together at a first common terminal and in series between the positive power supply and the base of said second transistor, the series resistance of said second and third resistors being much greater than said first resistance, a first diode connected at its anode terminal to the base of said first transistor and at its cathode terminal to said first common terminal, a negative power supply, a third normally cut off NPN transistor having its emitter-collector path connected between said first common terminal and said negative power supply, first gating means responsive to the coincidence of a clock pulse input and a first gating signal for turning on said third transistor, a fourth NPN transistor having base, emitter and collector electrodes, the emitter being connected to the second input terminal and the collector being connected to the positive power supply, a fourth resistor connected between the base of said fourth transistor and said positive power supply, a fifth NPN transistor having base, emitter and collector electrodes, the collector electrode being connected to the base of said fourth transistor and the emitter being connected to the reference potential, fifth and sixth resistors connected together at a second common terminal and in series between the positive power supply and the base of said fifth transistor, the resistance of said fifth and sixth resistors being much greater than said third resistance, a second diode connected at its anode terminal to the base of said fourth transistor and at its cathode terminal to said second common terminal, a sixth normally cut-off NPN transistor having its emitter-collector path connected between said second common terminal and said negative power supply, and second gating means responsive to the coincidence of a clock pulse and a second gating signal for turning on said sixth transistor.

References Cited

UNITED STATES PATENTS

| | | | |
|---|---|---|---|
| 2,816,237 | 1957 | Hageman | 307—247 |
| 3,102,208 | 1963 | Reach | 307—292 |
| 3,237,024 | 2/1966 | Mavity | 307—269 |
| 3,247,399 | 3/1966 | Moody | 328—206 |
| 3,305,728 | 2/1967 | Bailey | 307—292 |

ARTHUR GAUSS, *Primary Examiner.*

H. A. DIXON, *Assistant Examiner.*

U.S. Cl. X.R.

307—247